(12) United States Patent
Moll et al.

(10) Patent No.: US 6,941,440 B2
(45) Date of Patent: Sep. 6, 2005

(54) ADDRESSING SCHEME SUPPORTING VARIABLE LOCAL ADDRESSING AND VARIABLE GLOBAL ADDRESSING

(75) Inventors: Laurent R. Moll, Saratoga, CA (US); James D. Kelly, Scotts Valley, CA (US); Manu Gulati, San Francisco, CA (US); Koray Oner, Sunnyvale, CA (US); Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 8 days.

(21) Appl. No.: 10/439,297

(22) Filed: May 15, 2003

(65) Prior Publication Data
US 2004/0044806 A1 Mar. 4, 2004

Related U.S. Application Data

(60) Provisional application No. 60/380,740, filed on May 15, 2002.

(51) Int. Cl.[7] .............................. G06F 9/42; G06F 3/00
(52) U.S. Cl. ........................... 711/202; 710/3; 709/213
(58) Field of Search ................. 711/202–203, 147–148; 709/213, 216; 710/3

(56) References Cited

U.S. PATENT DOCUMENTS

| | | | |
|---|---|---|---|
| 4,433,378 A | | 2/1984 | Leger |
| 4,463,424 A | | 7/1984 | Mattson et al. |
| 4,760,571 A | | 7/1988 | Schwarz |
| 5,274,789 A | * | 12/1993 | Costa et al. ............... 711/206 |
| 5,522,045 A | * | 5/1996 | Sandberg .................... 709/215 |
| 5,640,399 A | | 6/1997 | Rostoker et al. |
| 5,668,809 A | | 9/1997 | Rostoker et al. |
| 5,778,414 A | | 7/1998 | Winter et al. |
| 5,802,287 A | | 9/1998 | Rostoker et al. |
| 5,829,025 A | | 10/1998 | Mittal |
| 5,887,187 A | | 3/1999 | Rostoker et al. |
| 5,893,150 A | | 4/1999 | Hagersten et al. |
| 5,908,468 A | | 6/1999 | Hartmann jf124c |
| 5,914,955 A | | 6/1999 | Rostoker et al. |
| 5,974,508 A | | 10/1999 | Maheshwari |
| 6,018,763 A | | 1/2000 | Hughes et al. |
| 6,021,451 A | | 2/2000 | Bell et al. |
| 6,092,137 A | | 7/2000 | Huang et al. |
| 6,098,064 A | | 8/2000 | Pirolli et al. |

FOREIGN PATENT DOCUMENTS

| | | |
|---|---|---|
| WO | WO 00/30322 | 5/2000 |
| WO | WO 00/52879 | 9/2000 |

OTHER PUBLICATIONS

SiByte; "Target Applications" http://sibyte.com/mercurian.applications.htm; Jan. 15, 2001; 2 pages.

(Continued)

*Primary Examiner*—Kim Huynh
(74) *Attorney, Agent, or Firm*—Garlick Harrison & Markison LLP (57) ABSTRACT

A node comprises at least one agent and an input/output (I/O) circuit coupled to an interconnect within the node. The I/O circuit is configured to communicate on a global interconnect to which one or more other nodes are coupled during use. Addresses transmitted on the interconnect are in a first local address space of the node, and addresses transmitted on the global interconnect are in a global address space. The first local address space includes at least a first region used to address at least a first resource of the node. The node is programmable, during use, to relocate the first region within the first local address space, whereby a same numerical value in the first local address space and a second local address space corresponding to one of the other nodes coupled to the global interconnect refers to the first resource in the node during use.

18 Claims, 8 Drawing Sheets

U.S. PATENT DOCUMENTS

| | | | |
|---|---|---|---|
| 6,111,859 A | 8/2000 | Godfrey et al. | |
| 6,151,662 A | 11/2000 | Christie et al. | |
| 6,157,623 A | 12/2000 | Kerstein | |
| 6,202,125 B1 | 3/2001 | Patterson et al. | |
| 6,202,129 B1 | 3/2001 | Palanca et al. | |
| 6,209,020 B1 | 3/2001 | Angle et al. | |
| 6,215,497 B1 | 4/2001 | Leung | |
| 6,262,594 B1 | 7/2001 | Cheung et al. | |
| 6,266,797 B1 | 7/2001 | Godfrey et al. | |
| 6,269,427 B1 | 7/2001 | Kuttanna et al. | |
| 6,279,087 B1 | 8/2001 | Melo et al. | |
| 6,321,309 B1 | 11/2001 | Bell et al. | |
| 6,332,179 B1 | 12/2001 | Okpisz et al. | |
| 6,349,365 B1 | 2/2002 | McBride | |
| 6,366,583 B2 | 4/2002 | Rowett et al. | |
| 6,373,846 B1 | 4/2002 | Daniel et al. | |
| 6,438,651 B1 | 8/2002 | Slane | |
| 6,446,185 B2 * | 9/2002 | Hagersten | 711/202 |
| 6,574,708 B2 | 6/2003 | Hayter et al. | |

OTHER PUBLICATIONS

SiByte; "SiByte Technology" http://sibyte.com/mercurian/technology.htm; Jan. 15, 2001; 3 pages.

SiByte; "The Mercurian Processor" http://sibyte.com/mercurian; Jan. 15, 2001; 2 pages.

SiByte; "Fact Sheet, SB-1 CPU" Oct. 2000; 1 page.

SiByte; "Fact Sheet, SB-1250" Oct. 2000; 10 pages.

Stepanian; "SiByte SB-1 MIPS64 CPU Core" Embedded Processo Forum 2000; Jun. 13, 2000, 15 pages.

Keller; "The Mercurian Processor: A High Performance, Power-efficient CMP for Networking" Oct. 10, 2000; 22 pages.

Saulsbury et al.; "An Argument for Simple COMA" SICS Research Report No.: R94:15; Aug. 1, 1994; 20 pages.

Lenoski; "The Design And Analysis Of Dash: A Scalable Directory-Based Multiprocessor" Dissertation-Stanford University; Dec. 1991; 176 pages.

"21143 PCI/Card Bus 10/100Mb/s Ethernet LAN Controller" Hardware Reference Manual; Intel Corp.; Oct. 1998.

"Pentium Pro Family Developer's Manual, vol. 1: Specifications" Intel Corporation; 1996; pp 4–1 to 4–18.

"PowerPC 601, RISC Microprocessor User's Manual" MPC601UM/AD; 1993; 1 page.

"Pentium Processor Family User's Manual, vol. 1: Pentium Processor Family Data Book"; Intel Corp.; 1994; 2 pages.

Katevenis et al.; "ATLAS I: a single–chip, gigabit ATM switch with HIC/HS links and multi–lane back–pressure" Microprocessors and Microsystems; 1998; pp 481–490.

Halfhill; "SiByte Reveals 64–Bit Core For NPUs, Independent MIPS64 Design Combines Low Power, High Performance" Microdesign Resources; Jun. 2000, 4 pages.

U.S. Appl. No. 09/680,524, filed Oct. 6, 2000; Rowlands et al.; "Source Triggered Transaction Blocking".

U.S. Appl. No. 09/829,514, filed Apr. 9, 2001; Kruckemyer et al.; "Cache Coherent Protocol In Which Exclusive . . . ".

U.S. Appl. No. 10/413,917, filed Apr. 15, 2003; Rowlands et al.; "Cache Programmable To Partition Ways To Agents . . . ".

U.S. Appl. No. 10/269,922, filed Oct. 11, 2002; Sano et al.; "Systems Using Mix of Packet, Coherent,and Noncoherent . . . ".

U.S. Appl. No. 10/270,028, filed Oct. 11, 2002; Rowlands; "System Having Interfaces, Switch, And Memory Bridge . . . ".

U.S. Appl. No. 10/269,827, filed Oct. 11, 2002; Rowlands et al.; "Remote Line Directory Which Covers Subset of . . . ".

U.S. Appl. No. 10/269,828, filed Oct. 11, 2002; Rowlands; "L2 Cache Maintaining Local Ownership Of . . . ".

U.S. Appl. No. 10/270,480, filed Oct. 11, 2002; Rowlands; "System Having Address–Based Intranode Coherency and . . . ".

* cited by examiner

ADDRESSING SCHEME SUPPORTING VARIABLE LOCAL ADDRESSING AND VARIABLE GLOBAL ADDRESSING

This application claims benefit of priority to U.S. Provisional Patent Application Ser. No. 60/380,740, filed May 15, 2002. The above application is incorporated herein by reference in its entirety.

BACKGROUND OF THE INVENTION

1. Field of the Invention

This invention is related to address spaces in multi-node systems and, more particularly, to mapping local and global addresses.

2. Description of the Related Art

In many systems, multiple nodes are coupled together to form the system. Each node may comprise an integrated circuit, or multiple integrated circuits and/or other devices (e.g. input/output (I/O) devices and/or interfaces). Each node has a local address space used to address memory in the node or coupled to the node ("local memory"), as well as various I/O devices or interfaces in the node. Typically, the address spaces are relatively fixed (e.g. various regions within the address space are dedicated to local memory or I/O devices). There may be some amount of programmability to the address space (e.g. regions of the address space mapped to memory may be sized to permit varying amounts of local memory).

The address space within each node of a multi-node system typically matches. That is, given the same amount of memory and the same I/O devices, the same numerical addresses in each local address space refer to the local memory or I/O devices in that node. Accordingly, sharing local memory or I/O devices with other nodes (permitting the other nodes to access and/or update the shared local memory or devices) is complicated. One typical mechanism is shown in FIG. 1.

Figure 1:
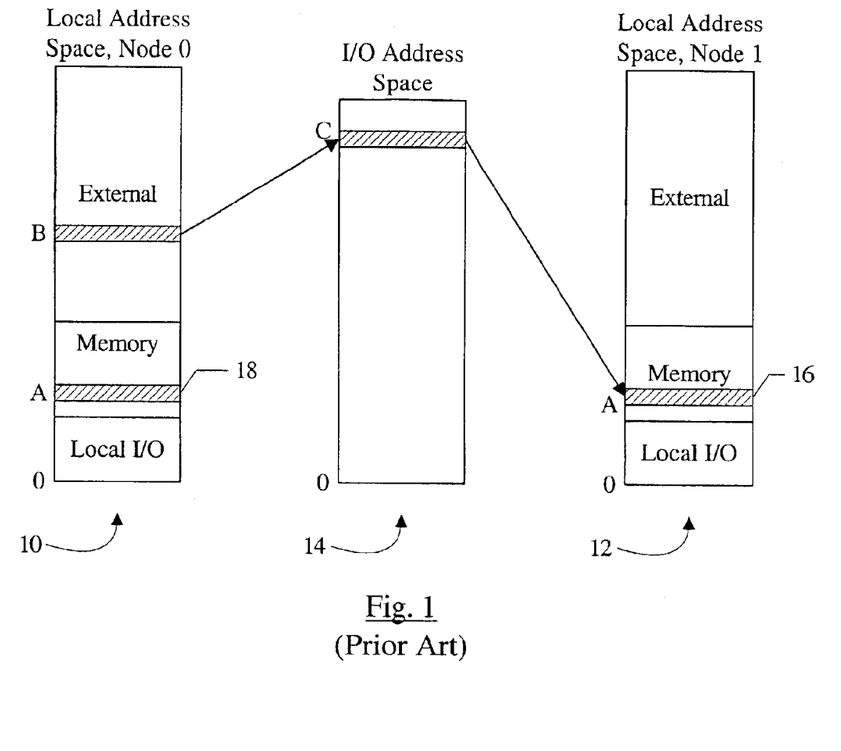
FIG. 1 is a block diagram of a prior art mapping addresses in local and global address spaces.

In FIG. 1, a local address space 10 corresponding to a first node (node 0), a local address space 12 corresponding to a second node (node 1), and an I/O address space 14 corresponding to an I/O interface used to communicate between node 0 and node 1 are shown. Address 0 is at the bottom of each address space in FIG. 1. Each local address space has a variety of regions (e.g. a local I/O region for the local I/O devices and interfaces in each node, a memory region for the local memory, and an external region which is mapped onto the I/O address space 14). While contiguous regions are shown in FIG. 1 for simplicity, multiple local I/O regions and/or memory regions may be defined in each local address space 10 and 12.

A shared memory location 16 in the node 1 local address space is also illustrated, via the cross-hatched box in the node 1 local address space 12. A shared I/O location (e.g. corresponding to a local I/O device or interface that is to be shared between the nodes) may be similar. The shared memory location 16 is addressed using an address A in the node 1 local address space 12. The address A cannot be used by node 0 to access the shared memory location 16, as the address A is in the memory region of the local address space 10 and refers to a local memory location 18 in the node 0. For node 0 to access the shared memory location 16, an address in the external region must be used (to cause a transaction on the I/O interface to communicate to node 1). Thus, for example, an address B in the external region at the local address space 10 may be assigned to the shared memory location 16. The address B is further mapped to an address C in the I/O address space 14, which is mapped to the address A in the local address space 12 by the node 1 in response to receiving the I/O transaction on the I/O interface.

In the illustrated mechanism, three different addresses (A, B, and C) are used to access the same memory location 16. If additional nodes (not shown) access the same memory location, even more addresses may be used. Such a scheme may create complexities for software executing on the system. For example, if a software process that accesses the memory location 16, and the process migrates from one node to another, the address used to access the memory location 16 must be recalculated. To perform the recalculation properly, the process must be "aware" of which node it is running on, which may complicate the process. Some currently existing software assumes that a given local address in the external region of the local address space is numerically equal to the corresponding I/O address in the I/O address space (although it clearly cannot be equal to the address in the other local address space, if a shared memory location or I/O device is being accessed in another node). Such assumptions further complicate address space management. In nodes in which virtual address spaces are implemented (e.g. nodes having processors), some software may even attempt to make the virtual address, the corresponding physical address in the local address space, and the corresponding I/O address numerically equal.

The illustrated mechanism also presents difficulties if cache coherency is to be maintained for the shared memory location. Typically, coherency schemes rely on comparing the addresses of transactions to the cached addresses in a given cache. However, if each node is using different addresses to access the same location, comparing the addresses is insufficient to detect an access to the same memory location as a cached memory location. Some multi-node cache coherent nonuniform memory access (CC-NUMA) systems use the most significant address bits as a node identifier identifying the node to which the address is mapped. Such systems typically design the interconnect between nodes to support a global address space that is shared by the nodes (e.g. the "local" address spaces are merely part of the global address space that is assigned to the node).

SUMMARY OF THE INVENTION

In one embodiment, a node comprises at least one agent and an input/output (I/O) circuit coupled to an interconnect within the node to communicate between the agent and the I/O circuit. The I/O circuit is configured to communicate on a global interconnect to which one or more other nodes are coupled during use. Addresses transmitted on the interconnect are in a first local address space of the node, and addresses transmitted on the global interconnect are in a global address space. The first local address space includes at least a first region used to address at least a first resource of the node. The node is programmable, during use, to relocate the first region within the first local address space, whereby a same numerical value in the first local address space and a second local address space corresponding to one of the other nodes coupled to the global interconnect refers to the first resource in the node during use.

A system is contemplated, in one embodiment, that comprises a global interconnect, a first node coupled to the global interconnect, and a second node coupled to the global interconnect. Addresses transmitted on the global interconnect are included in a global address space. The first node has a first local address space and comprise at least one resource addressed using a first region within the first local address space. Similarly, the second node has a second local address space. The first node is programmable, during use, to relocate the first region within the first local address space. Additionally, the second node is programmable, during use, to relocate regions within the second local address space to map a second region within the second local address space for transmission on the global interconnect. The second region comprises addresses having the same numerical value as addresses in the first region, whereby the resource in the first node is accessed using a same numerical value of the address in the first local address space and the second local address space during use.

In another embodiment, a method is contemplated. A first node is configured to map a first region of a global address space to a second region of a first local address space within the first node. The second region is defined to address at least one resource in the first node. The first node is programmed to relocate the second region within the first local address space, whereby a same numerical value is used in the first local address space and in the global address space to address a location in the first region.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
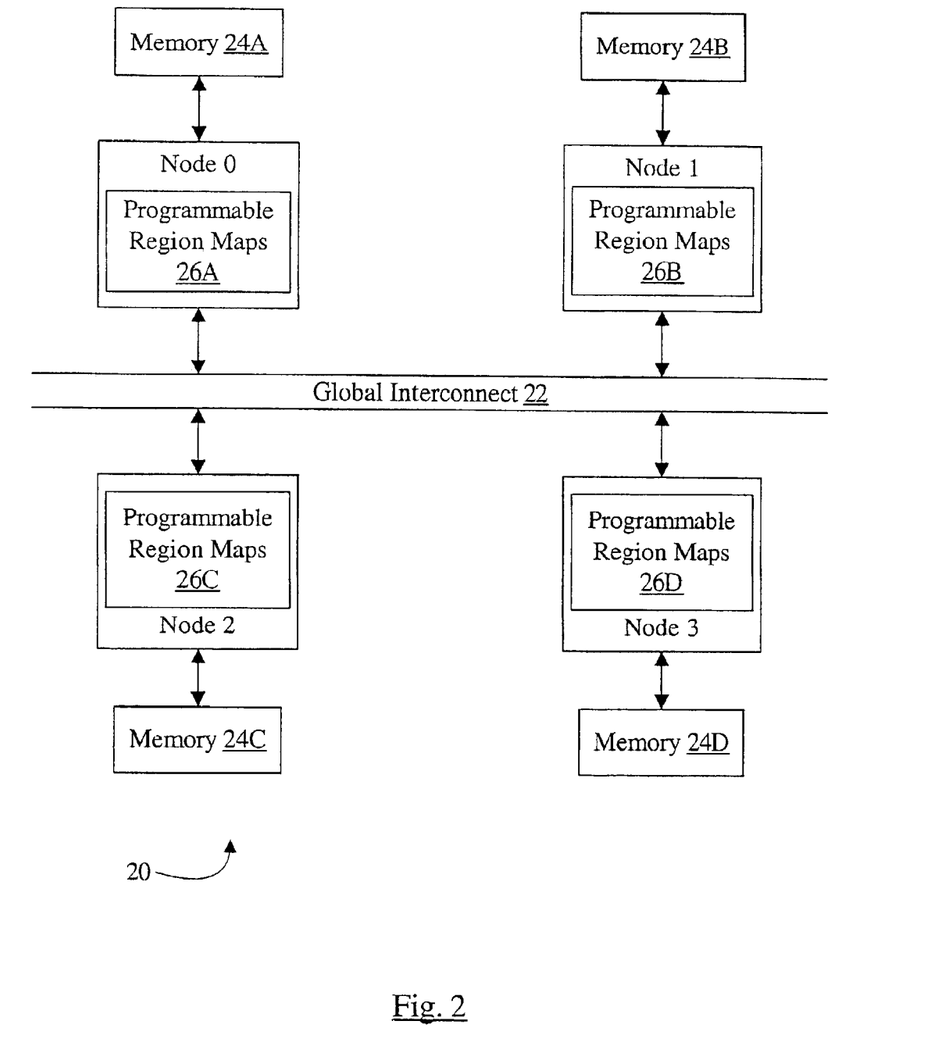
FIG. 2 is a block diagram of one embodiment of a plurality of nodes in a system.

Turning now to FIG. 2, a block diagram of one embodiment of a system 20 including a plurality of nodes (node 0 through node 3) coupled to a global interconnect 22 is shown. In the illustrated embodiment, each node is coupled to a respective local memory 24A–24D. Each node includes a storage (26A–26D, respectively, in FIG. 2) that stores programmable region maps. The number of nodes in a given embodiment may vary, and may be more or fewer than the number of nodes shown in FIG. 2. Additionally, not all nodes may have local memory, in some embodiments.

Each node may have its own local address space, used to address (or "refer to") resources within the node. Additionally, a global address space is employed for transactions on the global interconnect 22. The transactions on the global interconnect 22 may be used, for example, to communicate between the nodes 0 through 3.

Each node may have one or more regions in its local address space. Each region is assigned one or more resources of the node. That is, a resource is addressed (or referred to) using an address or addresses within the region to which that resource is assigned. The remainder of the local address space (i.e. those addresses that are not within the regions) may be defined as an external region that causes the node to generate a transaction on the global interconnect 22. Each node is programmable to relocate the regions within the local address space (e.g. by programming the storages 26A–26D). Thus, the local address (or addresses) used to address a given resource is programmable, and may be moved about in the local address space. By relocating regions having resources that are to be shared with other nodes, the numerical value of the local address used to address the resources may be made equal to the numerical value of the local address (within the external region of the local address space) of the other nodes that are to share the resource. Thus, the same numerical value may be used in any local address space to address a resource within a particular node. Processes that may migrate from node to node may use the same address to access a given resource in a given node. That is, if the process is executing on the given node, the access to the given resource may occur locally in that given node because the address is within the region corresponding to that resource. If the process is executing on a different node, the address is within the external region and thus the node may generate a global transaction on the global interconnect 22 to the given node, and the given node may access the resource in response to the global transaction.

The nodes may also be programmed to make one or more resources private (i.e. not shared). If the same region in each node is programmed to the same address range within each local address space, then resources within those regions will be private to the local node.

Additionally, in some embodiments, the numerical value of the local address may be made equal to the global address mapped to the resource. Generally, there may be a mechanism for exposing regions that are accessible via transactions on the global interconnect 22, and these regions may be programmed during initialization of the system 20 to a region of the global address space. For example, in some embodiments, the global interconnect 22 may be compatible with peripheral component interconnect (PCI) specification or the HyperTransport™ (HT) specification. These specifications use special configuration commands to access configuration header data structures for each device on the interface. The configuration header stores information identifying the device, its functions, etc. The size of an address range used to address the device may also be identified. The beginning of the address range may be programmable in a base address register (BAR), thus permitting a region of the global address space to be assigned to the device. A given device may have multiple address ranges assigned in this manner. Thus, for example, a node may have an address range corresponding to each relocatable region, and the BAR for the region may be programmed during initialization. Nodes may have additional address ranges/BARs for other purposes as well. In other embodiments, the numerical value of the global address may differ from the numerical value of the corresponding local addresses.

In some embodiments, internode coherency may be maintained for memory resources that are shared between nodes. For example, a CC-NUMA scheme may be used. Since the same numerical value of addresses in each local address space are used to access the shared memory resource, the addresses may be compared to maintain coherency between accesses by various nodes. Some memory resources (e.g. memory storing interrupt/exception vectors, or the memory storing the boot read-only memory (ROM) or programmable ROM (PROM)) may be maintained private (and non-coherent at the internode level), and other memory regions may be shared.

As used herein, a "node" may comprise any set of one or more integrated circuits, I/O devices or interfaces, and other circuitry which are arranged together and interact using a local address space. An "address space" may comprise a set of addresses which are used to communicate between various components. A "local address space" may be used to communicate within a node, and a "global address space" may be used to communicate between nodes. Addresses in different address spaces may not necessarily have any relationship to each other. However, as mentioned above, the storages 26A–26D may be programmed to make certain addresses within the address spaces be numerically equal. A "region" of an address space comprises a contiguous range of addresses within the address space. A relocatable region may be programmable as to where region is located in the address space. A node may have one or more resources that are addressable via addresses in the address space. More particularly, each resource may be assigned to one of the regions defined in the address space. As used herein, the term "resource" may generally refer to any device or circuitry that may be used to provide a function. The term resource may include portions of the local memory (e.g. the memory 24A for node 0) and/or I/O devices or interfaces in the node. The memory may provide a storage function, and the I/O devices or interfaces may provide any desired peripheral function.

The storages 26A–26D may be programmed to map the region in the local address spaces, as mentioned above, and may further include storage for the BAR programming mentioned above for the global interconnect 22. Generally, the storages 26A–26D may be implemented as any sort of storage device. For example, the storages 26A–26D may be implemented as registers or other clocked storage devices, memory such as random access memory (RAM), content addressable memory (CAM), or combinations of the above storage devices. Each storage 26A–26D may be distribute among the node components within the corresponding node, including duplicating storage among the node components as desired.

The global interconnect 22 may be any form of communication medium between the nodes. For example, in various embodiments, the interconnect 22 may include shared buses, crossbar connections, point-to-point connections in a ring, star, daisy-chain, or any other topology, meshes, cubes, etc. The global interconnect 22 may also include storage, in some embodiments. In one particular implementation, the global interconnect 22 may comprise point-to-point connections for packet-based communication as defined in the HT specification. In another implementation, the global interconnect 22 may comprise a shared bus compatible with the PCI specification. Other implementations may use other industry-standard I/O interconnects or a custom-designed interconnect, as desired. A transaction transmitted on the interconnect may include a communication sourced by one of the nodes on the interconnect and targeting at least one other node on the interconnect. Some transactions may target more than one node (e.g. a broadcast or multicast transaction). The transaction includes an address in the global address space, and may include a transfer of data (e.g. a read or write transaction). If a coherency scheme (e.g. CC-NUMA) is implemented for internode coherency, transactions may also include transactions to maintain coherency (e.g. probe commands, acknowledgements of the probe commands, data transfers, etc.)

Each of the memories 24A–24D may comprise any type of memory device. For example, the memories 24A–24D, in various embodiments, may include synchronous dynamic RAM (SDRAM), and more particularly double data rate (DDR) SDRAM, DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

Figure 3:
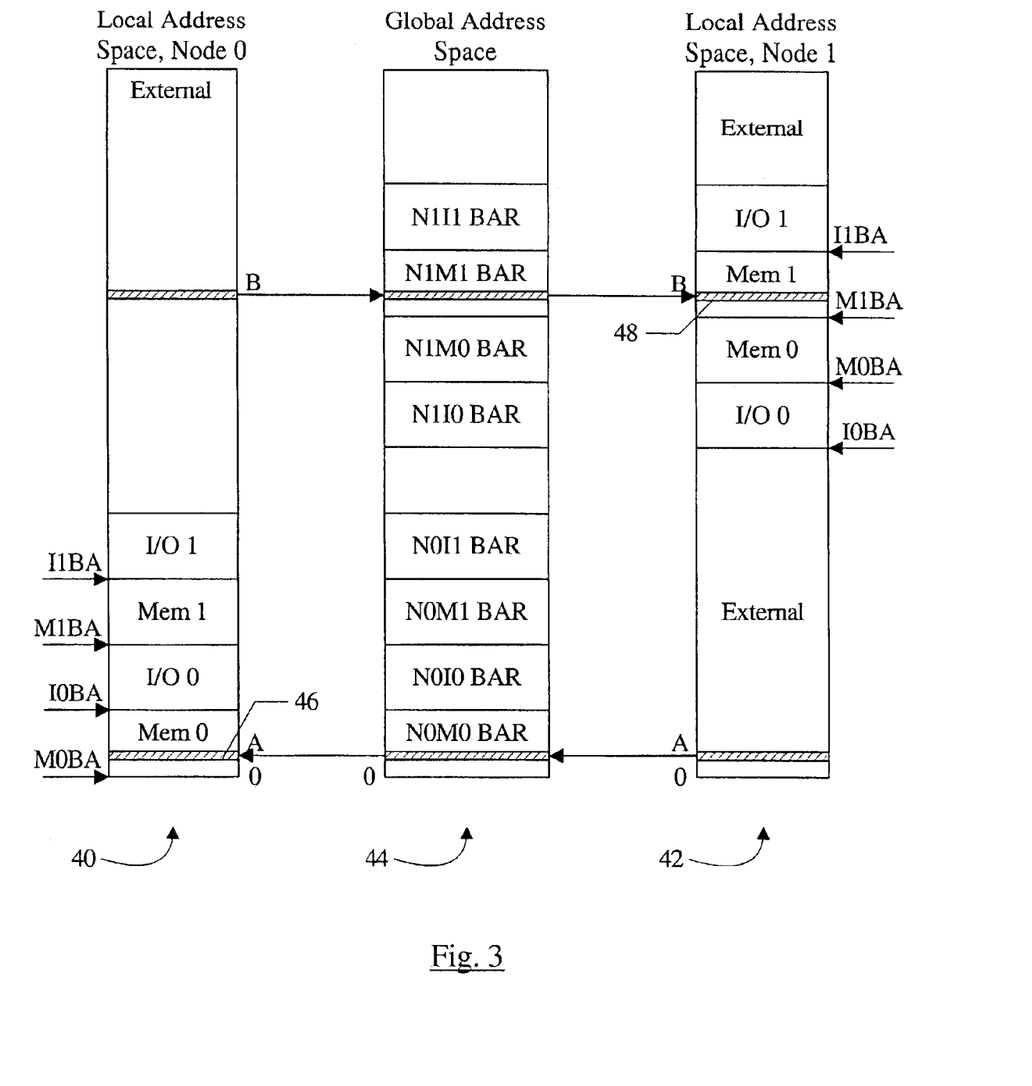
FIG. 3 is a block diagram illustrating one embodiment of address spaces and mapping addresses.

FIG. 3 is a block diagram illustrating one embodiment of the local address spaces for nodes 0 and 1 (reference numerals 40 and 42, respectively) and a global address space 44 corresponding to the global interconnect 22. Similar to FIG. 1, address 0 in each space is shown at the bottom of the space.

In the illustrated embodiment, there are four relocatable regions in the local address spaces, labeled "Mem 0", "I/O 0", "Mem 1", and "I/O 1". In this embodiment, each region has an associated base address pointer, labeled "M0BA" (Mem 0 base address), "I0BA" (I/O 0 base address), "M1BA" (Mem 1 base address), and "I1BA" (I/O 1 base address), respectively. Mem 0 and Mem 1 are memory regions (each mapped to a portion of the local memory in the corresponding node). I/O 0 and I/O 1 are I/O regions, each mapped to one or more I/O devices or interfaces in the node. The remainder of the local address spaces 40 and 42 are "external". The node responds to a transaction having an external address by generating a global transaction on the global interconnect 22.

In the node 0 local address space 40, the relocatable regions are programmed to the low end of the local address space. This may also be the default location of the regions, for one embodiment (i.e. if no programming is performed, the regions are located as shown for the node 0 local address space 40).

In the node 1 local address space 42, the relocatable regions are programmed to numerical values that correspond to the external address region in the node 0 local address space 40. Similarly, the low end of the node 1 local address space 42 is part of the external region and thus the relocatable regions of the node 0 local address space 44 are programmed to numerical values that correspond to the external address region in the node 1 local address space 42. In this example, each of the relocatable regions of the local address space 40 are accessible using the same numerical addresses in the node 1 local address space 42, and vice versa.

For example, an access to the location 46 in the Mem 0 region may use an address A. If the access to address A is performed by an agent in the node 0, the access may be a local access to the local memory 24A that is mapped to the Mem 0 region. No activity on the global interconnect 22 may occur (unless the location 46 is coherent and coherency activity such as probes are needed). If the access to address A is performed by an agent in the node 1, the node 1 recognizes address A as being external and transmits a global transaction on the global interconnect 22. The transaction is mapped through the BAR corresponding to the Mem 0 region in the node 0 (labeled N0M0 BAR in FIG. 3) to the location 46. Thus, the same numerical address may be used in both nodes 0 and 1 to access the location 46.

Similarly, an access to the location 48 in the Mem 1 region of the node 1 local address space 42 may use an address B. If the access to address B is performed by an agent in the node 1, the access may be a local access to the local memory 24B that is mapped to the Mem 1 region. No activity on the global interconnect 22 may occur (unless the location 48 is coherent and coherency activity is needed). If the access to address B is performed by an agent in the node 0, the node 0 recognizes address B as being external and transmits a global transaction on the global interconnect 22. The transaction is mapped through the BAR corresponding to the Mem 1 region in the node 1 (labeled N1M1 BAR in FIG. 3) to the location 48. Thus, the same numerical address may be used in both nodes 0 and 1 to access the location 48.

As alluded to above, each relocatable region may have an associated BAR to map the region in the global address space 44. Thus, in this example, there are 4 BARs for the 4 relocatable regions in node 0: "N0M0 BAR" corresponding to the Mem 0 region in node 0; "N0I0 BAR" corresponding to the I/O 0 region in node 0; "N0M1 BAR" corresponding to the Mem 1 region in node 0; and "N0I0 BAR" corresponding to the I/O 1 region in node 0. Similarly, there are 4 BARs for the 4 relocatable regions in node 1: "N1M0 BAR" corresponding to the Mem 0 region in node 1; "N1I0 BAR" corresponding to the I/O 0 region in node 1; "N1M1 BAR" corresponding to the Mem 1 region in node 1; and "N1I1 BAR" corresponding to the I/O 1 region in node 1. Additional BARs may be defined for relocatable regions in other nodes.

Additionally, in this example, the relocatable regions have been aligned to the numerical address in their corresponding BARs. In so doing, the same numerical address is also used on the global interconnect 22 to access a shared location. Additionally, the example of FIG. 3 does not show any non-relocatable regions. However, embodiments are contemplated in which one or more regions are provided that are not relocatable. These regions may have fixed locations in the local address space, and the relocatable regions may not be programmed to overlap with the non-relocatable regions. The non-relocatable regions also may not, if desired, be represented in the programmable region maps in the nodes. Since they are fixed, the non-relocatable regions may be decoded by dedicated decode circuitry. Alternatively, the non-relocatable regions may be represented in the programmable region maps as well, to use the same mechanism for all addresses.

Figure 4:
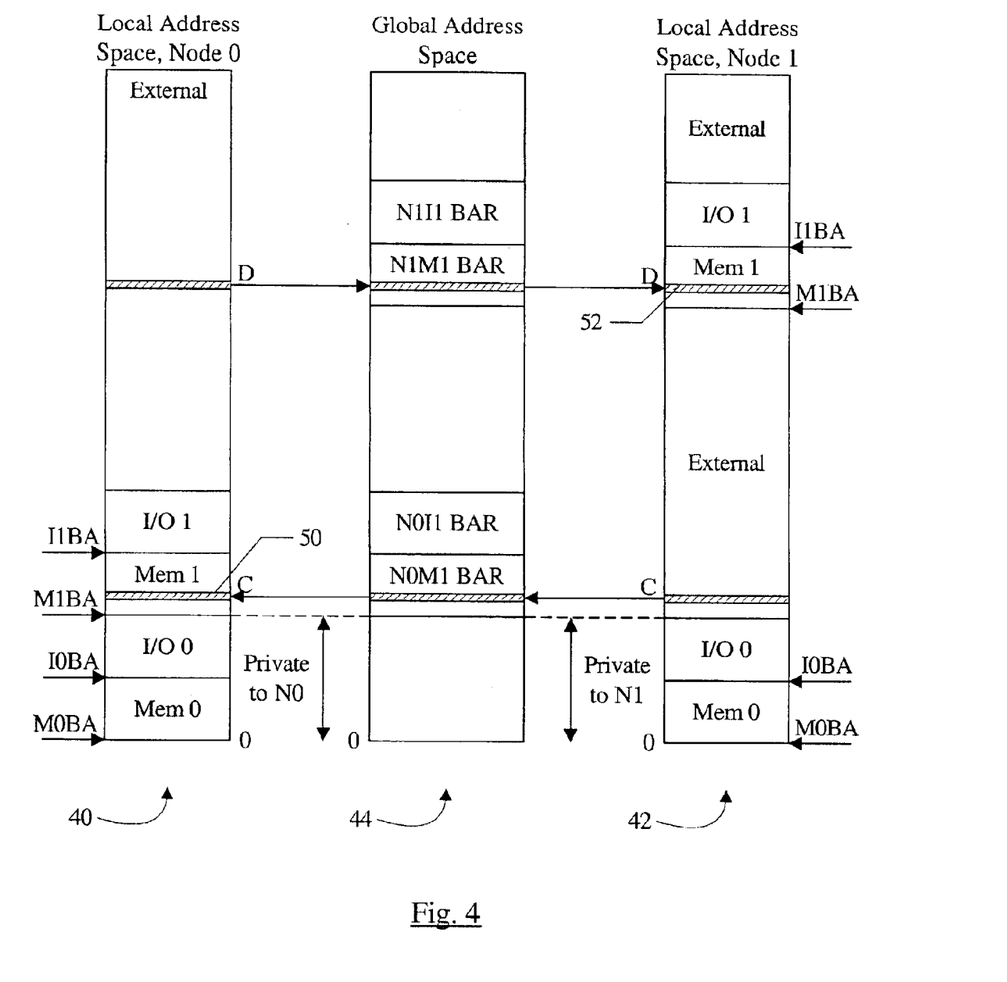
FIG. 4 is a block diagram illustrating a second embodiment of address spaces and mapping addresses.

Each of the relocatable regions are shared in the example of FIG. 3. However, it may be desirable to share some regions and not others. FIG. 4 is an example of sharing the Mem 1 and I/O 1 regions of each of the local address spaces 40 and 42, but keeping the Mem 0 and I/O 0 regions of each of the local address spaces 40 and 42 private. Accordingly, the Mem 0 and I/O 0 regions in nodes 0 and 1 are programmed to the same numerical addresses within their respective local address spaces 40 and 42. The Mem 1 and I/O 1 regions are programmed to addresses in their local address spaces 40 and 42 which are in the external region of the other local address space 42 and 40.

Therefore, an access to an address within the Mem 0 or I/O 0 regions by an agent in node 0 is completed locally in node 0. Similarly, an access to an address within the Mem 0 and I/O 0 regions by an agent in node 1 is completed locally in node 1. An agent in node 1 may not access the Mem 0 or I/O 0 regions of node 0, and an agent in node 0 may not access the Mem 0 or I/O 0 regions of node 1. On the other hand, a location 50 in the Mem 1 region of the node 0 local address space 40 may be accessed using an address C in either of the local address spaces 40 and 42, and the location 52 in the Mem 1 region of the node 1 local address space 42 may be accessed using an address D in either of the local address spaces 40 and 42, similar to the discussion above with regard to locations 46 and 48 in FIG. 3.

In addition to programming the Mem 0 and I/O 0 regions to the same numerical value within their respective local address spaces, the nodes 0 and 1 may not expose the corresponding BARs (N0M0 BAR, N0I0 BAR, N1M0 BAR, and N1I0 BAR) to the initialization code that maps BARs into the global address space. Thus, there is no mapping of the Mem 0 and I/O 0 regions in the global address space 44 in FIG. 4.

While FIGS. 3 and 4 illustrate two local address spaces, there is a local address space for each node in the system 20. The relocatable regions may be programmed to addresses that numerically match the external region of each other local address space, or the external region of at least those local address spaces with which sharing is desired.

Figure 5:
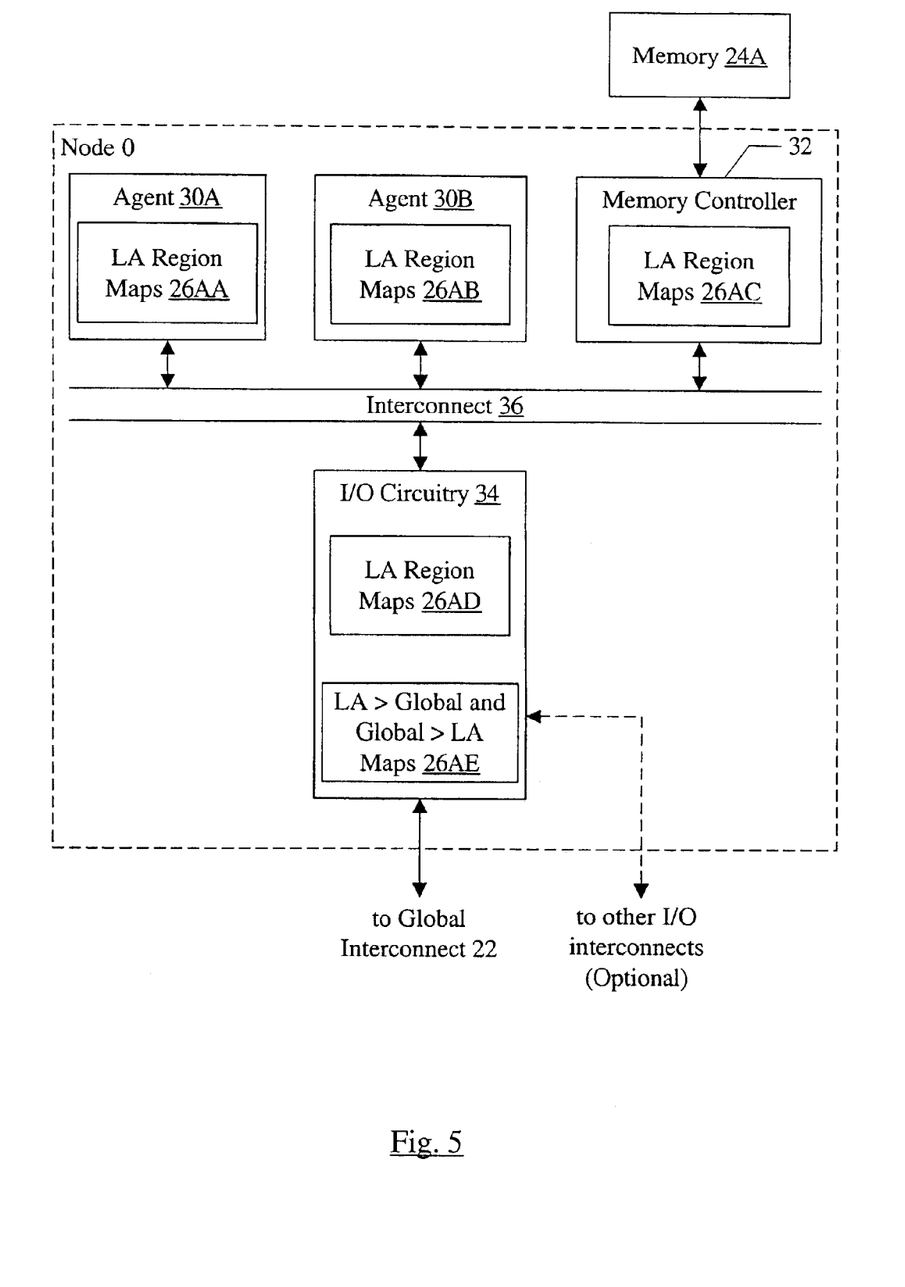
FIG. 5 is a block diagram of one embodiment of a node shown in FIG. 2.

Turning next to FIG. 5, a block diagram of one embodiment the node 0 shown in FIG. 2 is shown. Other nodes 1–3 may be similar. In the embodiment of FIG. 5, the node 0 includes one or more agents (e.g. agents 30A–30B in FIG. 5), a memory controller 32 for coupling to the memory 24A, I/O circuitry 34, and an interconnect 36. The agents 30A–30B, the memory controller 32 and the I/O circuitry 34 are coupled to the interconnect 36. The I/O circuitry is further coupled to the global interconnect 22, and may optionally be coupled to one or more other I/O interconnects. As illustrated in FIG. 5, the agents 30A–30B, the memory controller 32, and the I/O circuitry 34 include one or more storages 26AA–26AD that store local address (LA) region maps. Additionally, the I/O circuitry 34 includes one or more storages 26AE that store LA to global and global to LA maps. The storages 26AA–26AE may be portions of the storage 26A shown in FIG. 2.

The agents 30A–30B may comprise devices which communicate on the interconnect 36. Generally, as used herein, an agent may be any device capable of communicating on the interconnect 36. For example, agents may comprise processors, caches, etc. The memory controller 32 and the I/O circuitry 34 may also be agents. Some agents may be capable of initiating transactions (source agents), and other agents may be capable of receiving transactions (target agents). Some agents may be capable of being both source and target agents. For example, processors may be source agents. The memory controller may be a target agent for transactions addressing the memory 24A. The I/O circuitry 34 may be a source agent for transactions generated in response to global transactions from the global interconnect 22, and may be a target agent for transactions that address I/O devices or are in the external region mapped to the global interconnect 22. Other agents may participate in a given transaction (e.g. a coherent transaction may have a variety of participating agents, including any agents that may cache data).

Each of the agents 30A–30B, the memory controller 32, and the I/O circuitry 34 is programmed with the LA region maps. The LA region maps are programmed to relocate the various regions defined in the local address space, and the remaining portion of the local address space may be mapped as external. Thus, the agents 30A–30B, the memory controller 32, and the I/O circuitry 34 may access the LA region maps to determine the region in which a given address is included (either an address that the agent is to sourced in a transaction or an address observed by the agent in a transaction on the interconnect 36). For a source address, the source agent may determine the target of the transaction (which may affect the type of transaction transmitted, its attributes such as cacheable vs. noncacheable, etc.). For a received address, determining the region may permit the agent to determine if it is to respond to the transaction (i.e. to determine if it is the target of the transaction). For example, the memory controller 32 and the I/O circuitry 34 may determine whether or not to respond to a transaction using the LA region maps. The memory controller 32 responds to memory regions and the I/O circuitry 34 may respond to the other regions (e.g. I/O regions or the external region).

In some embodiments, the LA region maps in a given agent may include an inbound region map and an outbound region map. The outbound region map may be used by a source agent for transactions that the agent is preparing to source on the interconnect 36. The outbound region map may be used in a variety of ways. For example, in one embodiment, flow control is implemented on the interconnect 36 using a source-blocking scheme. That is, each agent may signal whether or not it is currently able to participate in a transaction. A source agent may determine whether or not to initiate a transaction dependent on whether the target agent and any other participating agents are signaling ability to participate in the transaction. The source agent may determine which agent is the target (e.g. the memory controller 32 or the I/O circuitry 36) by looking up the transaction address using the outbound region map, and also may determine other participating agents (e.g. dependent on whether the transaction is coherent or not).

The inbound region map may be used by potential target agents to determine if the transaction on the interconnect 36 is targeted at that agent. In some cases, an agent may be a proxy for indicating ability to participate in transactions for another agent. In such cases, the proxy agent may use the inbound region map to compute whether or not the other agent is able to participate in transactions. Generally, both the outbound region map and the inbound region map may receive a local address as an input, and may output an indication of the region that the address is included in. In some cases, if the agent maps the local address to a different address internally, the inbound region map may output information used to map the local address to the internal address.

Since the region maps are distributed to the various agents in the node 0, a mechanism to synchronize updates to the maps may be implemented. For example, a broadcast transaction on the interconnect 36 may be used to provide the contents of the region maps to each of the storages 26AA–26AD. The broadcast may be implemented, for example, as a write transaction to a predetermined "well-known" address, and the data for the write transaction may be the updated content for the region maps. Each agent 30A–30B, 32, and 34 may receive the content and update the LA region maps accordingly.

The region maps may represent the mapping of the regions in any desired fashion. For example, in one embodiment, each region may have a base address pointer identifying the base address (a local address in the local address space) of the region. The region maps may store the pointers, or may represent the region in any other desired fashion.

The I/O circuitry 34 further includes LA to global and global to LA maps. The LA to global map may be used to map local addresses that are in an I/O region or the external region to global addresses for a global transaction to be initiated on the global interconnect 22. Similarly, the global to LA map may be used to map global addresses (from global transactions received on the global interconnect 22) to local addresses. Generally, the LA to global and global to LA maps may reflect the BAR addresses programmed into the node 0 during initialization of the system 20. The maps may include the BARs, or may represent the information programmed into the BARs in some other fashion. In some cases (e.g. the relocatable regions), the local and global addresses may be numerically equal. In other cases, the local and global addresses may differ. Additionally, there may be other types of regions (e.g. match bit lane and match byte lane regions for PCI or HT transactions, special access regions such as configuration regions, etc.) in some embodiments.

The interconnect 36 may be any type of communication medium. For example, the interconnect 36 may be any of the types of interconnect given above for the global interconnect 22. In one particular embodiment, the interconnect 22 may comprise a split transaction bus. Source agents may transmit transactions on the interconnect 36, including addresses in the local address space of the node.

The memory controller 32 may be configured to access any type of memory. Fro example, the memory controller 32 may be configured to access any of the various types of memory described above with regard to FIG. 2 for the memories 24A–24D.

The I/O circuitry 34 may include circuitry for communicating on the global interconnect 22 and the interconnect 36, and for initiating transactions on one interconnect in response to being a target of a transaction on the other interconnect. The I/O circuitry 34 may also include various local I/O devices or interfaces for the node 0 (that is, the local I/O devices and interfaces that are assigned to one or more relocatable I/O regions in the local address space of the node 0). An example of one embodiment of the I/O circuitry 34 is shown in FIG. 6 and described in more detail below.

It is noted that, in some embodiments, a node may define one or more regions in the local address space that are not relocatable, if desired. In one embodiment, the node 0 may be integrated onto a single integrated circuit as a system on a chip (SOC) configuration.

Figure 6:
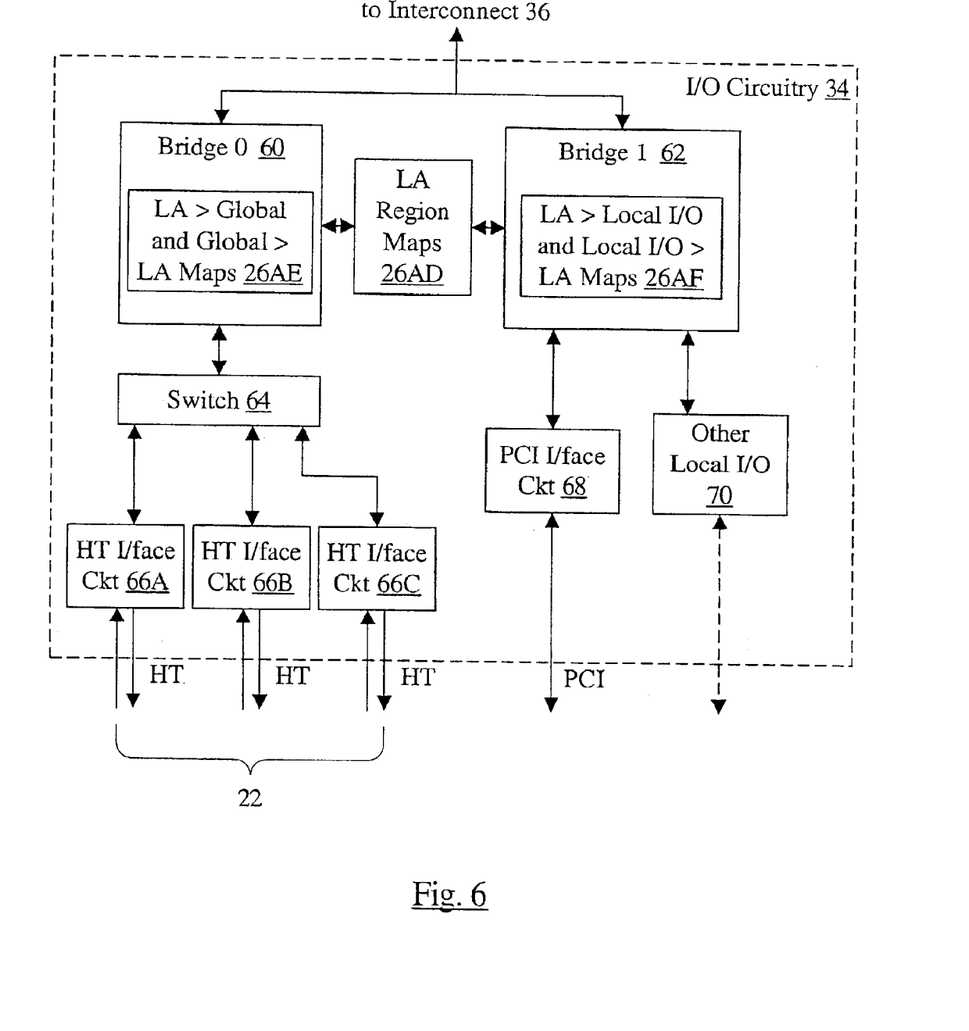
FIG. 6 is a block diagram of one embodiment of I/O circuitry shown in FIG. 5.

Turning now to FIG. 6, a block diagram illustrating one embodiment of the I/O circuitry 34 is shown. In the illustrated embodiment, the I/O circuitry 34 includes a first bridge 60, a second bridge 62, a switch 64, a set of HT interface circuits 66A–66C, a PCI interface circuit 68, and other local I/O circuitry 70. The bridges 60 and 62 are coupled to the interconnect 36. The bridge 60 is further coupled to the switch 64, which is still further coupled to the HT interface circuits 66A–66C. Each of the HT interface circuits 66A–66C, each of which are coupled to HT interfaces which form a portion of the global interconnect 22. The bridge 62 is further coupled to the PCI interface circuit 68 (which is further coupled to a PCI bus) and other local I/O circuitry 70 (which may optionally be coupled to other I/O interfaces). Both of the bridges 60 and 62 may be coupled to the LA regions maps storage 26AD as well.

The first bridge 60 may be responsible for bridging transactions between the interconnect 36 and the global interconnect 22 (which in this embodiment may comprise HT interfaces). Thus, the bridge 60 may include LA to global and global to LA maps (stored in a storage 26AE) to map local addresses to global addresses and vice-versa. Additionally, the first bridge 60 may be coupled to the storage 26AD to access the LA region maps, to detect those addresses that are in the external region of the local address space. The bridge 60 may generate HT transactions in response to local transactions on the interconnect 36 for transmission on the global interconnect 22. The HT transactions are transmitted, through the switch 64, to the HT interface circuit 66A–66C coupled to the HT interface on which the HT transaction is to be transmitted. The HT interface is a set of point-to-point links to other devices (e.g. other nodes) and thus which interface the HT transaction is to be transmitted on is dependent on the receiving device. The LA to global maps may store an indication of which interface to use, or another mechanism may be used to identify the interface on which the HT transaction is to be transmitted. Additionally, HT transactions received by the HT interfaces may be passed, through the switch, to the bridge 60 if the target is the node 0. There may be enough information in the received HT transaction to determine if the target is node 0, or the HT interface circuits 66A–66C may include storage for a routing map used to determine if the target is node 0, or which interface to route the received HT transaction on if the target is not node 0.

It is noted that, while 3 HT interface circuits 66A–66C are shown in FIG. 6, other embodiments may include any number of HT interface circuits 66A–66C. In some embodiments, the HT interface circuits 66A–66C may be programmable as either HT interface circuits or as System Packet Interface (SPI) interface circuits (e.g. SPI-4). It is noted that, while the switch 64 is used to transfer data between the bridge 60 and the HT interface circuits 66A–66C, other embodiments may not include the switch and may directly couple the HT interface circuits 66A–66C and the bridge 60.

The second bridge 62 may be responsible for bridging transactions between the interconnect 36 and the various local I/O devices or interfaces. An I/O device or interface is local if it is not used to communicate with other nodes in the system 20. Thus, for example, the PCI interface circuit 68 may be used to couple the node 0 to various peripheral devices, and may be a local I/O interface. The other local I/O circuits may include various devices and interfaces (e.g. a generic bus for access to a boot PROM, serial and/or parallel ports, personal computer memory card interface (PCMCIA) ports, one or more Ethernet media access controllers (MACs), etc.). In some cases, the local addresses are mapped to local I/O addresses and vice versa, and thus a storage 26AF may be included to map the addresses. For example, transactions received on the PCI bus may be mapped through one or more PCI BARs to local addresses. Any desired mapping mechanisms may be used. Additionally, since one or more of the local I/O devices/interfaces may be included in the relocatable I/O regions in the local address space, the second bridge 62 may be coupled to the storage 26AD to access the local address region maps.

Figure 7:
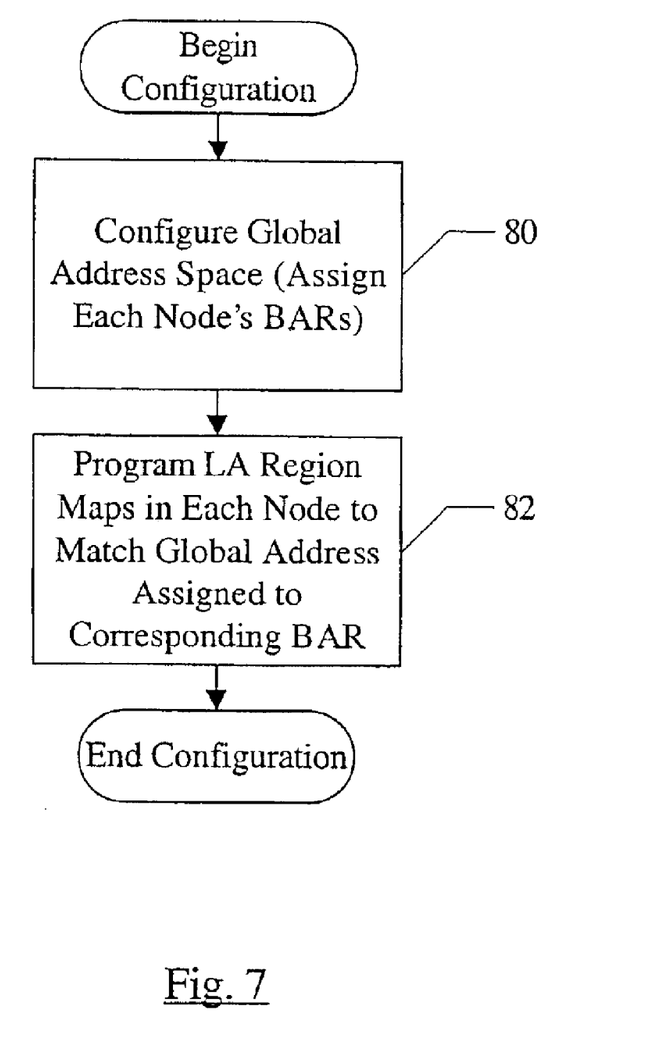
FIG. 7 is a flowchart illustrating one embodiment of configuring nodes in the system shown in FIG. 2.

Turning next to FIG. 7, a flowchart is shown illustrating configuration of the nodes in a system 20. The flowchart of FIG. 7 may be implemented as software instructions which, when executed (e.g. on a processor within one of the nodes, for example), implement the functions shown in FIG. 7.

The configuration software may configure the global address space (assigning each nodes BARs, including BARs corresponding to the relocatable regions of the local address space in each node) (block 80). Block 80 may comprise instructions which, when executed, perform configuration accesses on the global interconnect 22 to detect all of the exposed BARs, and to assign them in the global address space.

Once the BARs have been assigned, the configuration software may program the LA region maps in each node to relocate the regions to addresses that numerically match the assigned BARs in the global address space (block 82). Thus, the global addresses and the local addresses in any local address space that are used to access a given region may be numerically equal.

Figure 8:
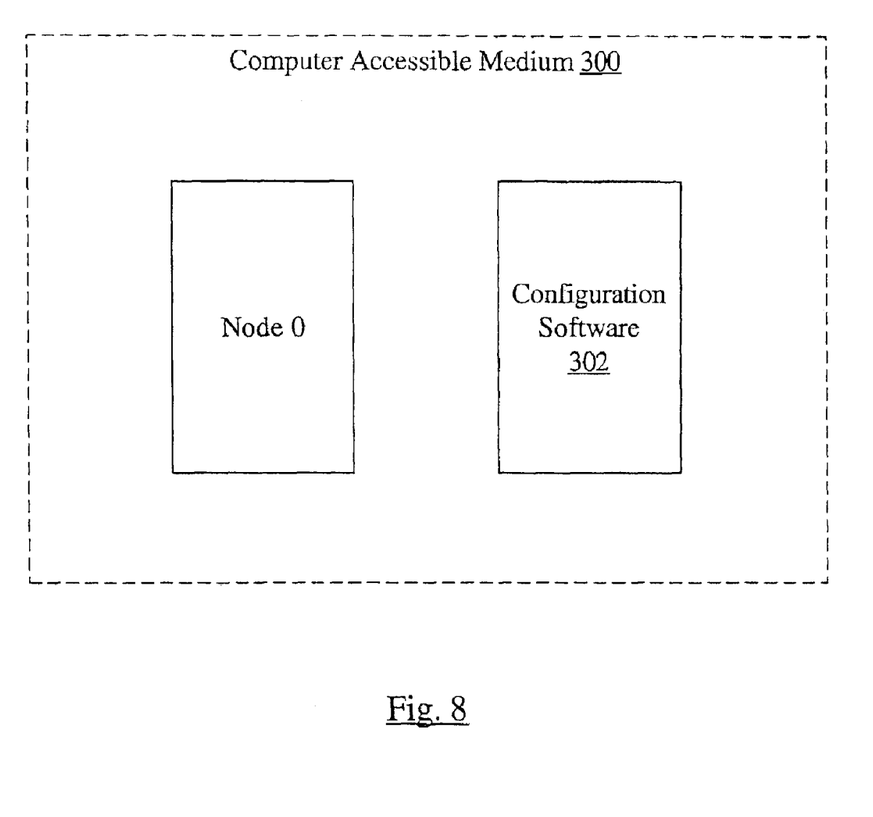
FIG. 8 is a block diagram illustrating one embodiment of a computer accessible medium.

Turning next to FIG. 8, a block diagram of a computer accessible medium 300 including one or more data structures representative of the circuitry included in the node 10 and/or the configuration software 302 that implements the flowchart of FIG. 7 is shown. Generally speaking, a computer accessible medium may include any media accessible by a computer during use to transfer data and/or instructions to/from the computer. The computer accessible medium may include storage media such as magnetic or optical media, e.g., disk (fixed or removable), CD-ROM, or DVD-ROM, various recordable or rewritable CD or DVD formats, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 0, other embodiments may include a representation of any portion of the node 0 (e.g. agents 30A–30B, memory controller 32, I/O circuitry 34, etc.). Additionally, the computer accessible medium 300 includes the instructions forming the configuration software 302 which, when executed, implement the flowchart of FIG. 7.

Attached hereto is an Appendix A comprising a description of various details that may be implemented in one embodiment of a system on a chip that may implement various features described above. Appendix A forms a part of this detailed description and is incorporated herein in its entirety.

Numerous variations and modifications will become apparent to those skilled in the art once the above disclosure is fully appreciated. It is intended that the following claims be interpreted to embrace all such variations and modifications.

What is claimed is:

1. A node comprising:

at least one agent and an input/output (I/O) circuit coupled to an internal interconnect within the node to communicate between the agent and the I/O circuit, wherein the I/O circuit is configured to communicate on a global interconnect to which one or more other nodes are coupled during use, and wherein an address transmitted on the internal interconnect to access a first resource of the node is to a first local address space of the node, and wherein an address transmitted on the internal interconnect to communicate on the global interconnect is in a global address space;

wherein the node is programmed, during use, to map the first local address space to a second local address space, in which the second local address space has a numerical value that does not conflict with resources of other node or nodes that communicate on the global interconnect and to allow the same numerical value for the second local address space and address spaces corresponding to the other node or nodes coupled to the global interconnect to refer to the first resource in the node by use of the numerical value.

2. The node as recited in claim 1 wherein the node is programmed, during use, to map a corresponding region of the global address space to allow the same numerical value to be used as a global address by all of the nodes coupled to the global interconnect to refer to the first resource.

3. The node as recited in claim 1 wherein the agent comprises a memory controller configured to couple to a memory, and wherein the first resource is included in the memory.

4. The node as recited in claim 3 wherein the memory controller is programmed, during use, to respond to the first local address space as relocated in the second local address space.

5. The node as recited in claim 1 wherein the I/O circuit includes one or more local I/O devices addressed by the first local address space, and wherein the I/O circuit is programmed, during use, to respond to the first local address space as relocated in the second local address space.

6. The node as recited in claim 1 wherein the second local address space is used to reference a plurality of resources.

7. The node as recited in claim 1 wherein the I/O circuit includes an overflow buffer configured to capture transmissions on the global interconnect.

8. The node as recited in claim 1 to maintain internode coherency using a cache-coherent nonuniform memory access scheme.

9. A system comprising:

a global interconnect, wherein addresses transmitted on the global interconnect are included in a global address space;

a first node coupled to the global interconnect, the first node having a first local address space to reference a first resource addressed by a first numerical value; and a second node coupled to the global interconnect, the second node having a second local address space to reference a second resource also addressed by the first numerical value;

wherein the second node is programmed, during use, to map the second local address space to a third local address space in the second node, in which the third local address space does not conflict with the first numerical value of the first local address space and in which a second numerical value addresses the second resource.

10. The system as recited in claim 9 wherein the second node is programmed, during use, to map a corresponding region of addresses to allow the same first numerical value to be used as a global address by the two nodes to refer to the first resource and to allow the same second numerical value to be used as a global address by the two nodes to refer to the second resource.

11. The system as recited in claim 10 wherein the first local address space is mapped to a fourth local address space.

12. The system as recited in claim 9 wherein the first node comprises a first memory controller configured to couple to its memory and wherein the first resource is included in the memory of the first memory controller, and the second node also comprises a second memory controller configured to couple to its memory and the second resource is included in the memory of the second memory controller.

13. The system as recited in claim 12 wherein the second memory controller is programmed, during use, to respond to the second local address space as relocated in the third local address space.

14. The system as recited in claim 9 wherein the second node includes one or more local I/O devices addressed by the second local address space, and wherein the first node is programmed, during use, to respond to the second local address space as relocated in the third local address space.

15. The system as recited in claim 9 wherein the third local address space is used to reference a plurality of resources.

16. A method comprising:

configuring a first node to map a first local address space for the first node to reference a first resource; and programming the first node to relocate the first local address space to a second local address space, in which a numerical value to access the second local address space does not conflict with a resource in a second node that communicates with the first node on a global interconnect from using the same numerical value.

17. The method as recited in claim 16 wherein configuring the first node comprises programming a global address to local address map storage in the first node to map the first local address space to the second local address space.

18. The method as recited in claim 16 further comprising programming the second node to relocate a local address space of the second node to prevent conflict of its corresponding numerical value on the global interconnect.

* * * * *